United States Patent
Iijima et al.

(10) Patent No.: US 6,782,714 B2
(45) Date of Patent: Aug. 31, 2004

(54) PLANT AND METHOD FOR PRODUCING LIQUEFIED NATURAL GAS

(75) Inventors: Masaki Iijima, Tokyo (JP); Kazuto Kobayashi, Hiroshima (JP); Hiroyuki Osora, Hiroshima (JP); Yoshio Seiki, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/640,016

(22) Filed: Aug. 14, 2003

(65) Prior Publication Data

US 2004/0035147 A1 Feb. 26, 2004

(30) Foreign Application Priority Data

Aug. 21, 2002 (JP) .......................................... 2002-240814

(51) Int. Cl.[7] .................................................. F25J 3/08
(52) U.S. Cl. ........................................................ 62/611
(58) Field of Search ............................ 62/606, 611, 928, 62/929

(56) References Cited

U.S. PATENT DOCUMENTS

| 4,033,735 A | * | 7/1977 | Swenson ..................... 62/612 |
| 5,318,758 A | * | 6/1994 | Fujii et al. ................... 423/228 |
| 5,344,627 A | * | 9/1994 | Fujii et al. ................... 423/220 |
| 5,956,971 A | * | 9/1999 | Cole et al. .................... 62/623 |
| 6,579,343 B2 | * | 6/2003 | Brennecke et al. ............ 95/51 |

* cited by examiner

Primary Examiner—Cheryl J. Tyler
Assistant Examiner—Malik N. Drake
(74) Attorney, Agent, or Firm—Oblon, Spivak, McClelland, Maier & Neustadt, P.C.

(57) ABSTRACT

A plant for producing liquefied natural gas comprises a carbon dioxide recovery apparatus for natural gas absorbing and removing carbon dioxide from natural gas, a liquefying apparatus having a steam turbine, for liquefying the natural gas from which carbon dioxide has been removed by the carbon dioxide recovery apparatus, a boiler equipment for supplying steam to the steam turbine of the liquefying apparatus, and a carbon dioxide recovery apparatus for combustion exhaust gas including an absorption tower for absorbing carbon dioxide from combustion exhaust gas exhausted from the boiler equipment by absorbing liquid, and a regeneration tower for separating and recovering carbon dioxide from the absorbing liquid.

10 Claims, 2 Drawing Sheets

PLANT AND METHOD FOR PRODUCING LIQUEFIED NATURAL GAS

CROSS-REFERENCE TO RELATED APPLICATIONS

This application is based upon and claims the benefit of priority from prior Japanese Patent Application No. 2002-240814, filed Aug. 21, 2002; the entire contents of which are incorporated herein by reference.

BACKGROUND OF THE INVENTION

1. Field of the Invention

The present invention relates to a plant and method for producing liquefied natural gas.

2. Description of the Related Art

Recently, liquefied natural gas (LNG) has attracted attention as a clean energy source. LNG is produced in an LNG plant by removing carbon dioxide ($CO_2$) and sulfur components, such as hydrogen sulfide ($H_2S$), from natural gas and removing the moisture content, and then liquefying the resultant gas in a liquefying apparatus. Specifically, $CO_2$ is removed from natural gas so that 50 ppm or less of $CO_2$ remains to prevent generation of dry ice during the LPG production process.

In such an LNG production method, a large amount of combustion exhaust gas containing $CO_2$ is produced by a power source (e.g., boiler) for driving a $CO_2$ recovery apparatus for removing $CO_2$ from natural gas, and a liquefying apparatus. Since $CO_2$ is released into the air as it is, it causes environmental problems including global warming.

The present invention is directed to providing a plant and method for producing liquefied natural gas, which comprises recovering $CO_2$ contained in natural gas and in a combustion exhaust gas generated from a power source, compressing the recovered $CO_2$ by a compressor, feeding out the compressed $CO_2$ from the system by feeding it to a plant such as a urea plant, methanol plant, dimethyl ether plant, or lamp oil/light oil synthesis plant (GTL plant), or the ground, thereby preventing or suppressing emission of $CO_2$ to the air.

BRIEF SUMMARY OF THE INVENTION

According to one aspect of the present invention, there is provided a plant for producing liquefied natural gas comprising:

a carbon dioxide recovery apparatus for natural gas absorbing and removing carbon dioxide from natural gas;

a liquefying apparatus having a steam turbine, for liquefying the natural gas from which carbon dioxide has been removed by the carbon dioxide recovery apparatus;

a boiler equipment for supplying steam to the steam turbine of the liquefying apparatus; and a carbon dioxide recovery apparatus for combustion exhaust gas including an absorption tower for absorbing carbon dioxide from combustion exhaust gas exhausted from the boiler equipment by absorbing liquid, and a regeneration tower for separating and recovering carbon dioxide from the absorbing liquid.

In the plant for producing liquefied natural gas, it is preferable that the carbon dioxide recovery apparatus for natural gas has an absorption tower for absorbing carbon dioxide from natural gas by absorbing liquid, and a regeneration tower for separating and recovering carbon dioxide from the absorbing liquid and that the regeneration tower also serves as the regeneration tower of the carbon dioxide recovery apparatus for combustion exhaust gas.

According to another aspect of the present invention, there is provided a method for producing liquefied natural gas comprising the steps of:

providing a plant for producing liquefied natural gas comprising:
  (a) a carbon dioxide recovery apparatus for natural gas absorbing and removing carbon dioxide from natural gas,
  (b) a liquefying apparatus having a steam turbine, for liquefying the natural gas from which carbon dioxide has been removed by the carbon dioxide recovery apparatus,
  (c) boiler equipment for supplying steam to the steam turbine of the liquefying apparatus, and
  (d) a carbon dioxide recovery apparatus for combustion exhaust gas including an absorption tower for absorbing carbon dioxide from combustion exhaust gas exhausted from the boiler equipment by absorbing liquid, and a regeneration tower for separating and recovering carbon dioxide from the absorbing liquid;

absorbing and removing carbon dioxide of natural gas by the absorbing liquid in the carbon dioxide recovery apparatus for natural gas;

liquefying the natural gas from which carbon dioxide has been removed by the carbon dioxide recovery apparatus for natural gas;

absorbing and removing carbon dioxide of combustion gas exhausted from the boiler equipment by the absorbing liquid in the carbon dioxide recovery apparatus for combustion exhaust gas; and regenerating the absorbing liquid by separating and recovering carbon dioxide from the absorbing liquid containing carbon dioxide in the regeneration tower of the carbon dioxide recovery apparatus for combustion exhaust gas.

In the method for producing liquefied natural gas, it is preferable that the absorbing liquid containing carbon dioxide absorbed by the carbon dioxide recovery apparatus for natural gas and the absorbing liquid containing carbon dioxide absorbed by the carbon dioxide recovery apparatus for combustion exhaust gas are regenerated by the same regeneration tower.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Now, the LNG production plant according to the present invention will be explained in detail with reference to the accompanying drawings.

Figure 1:
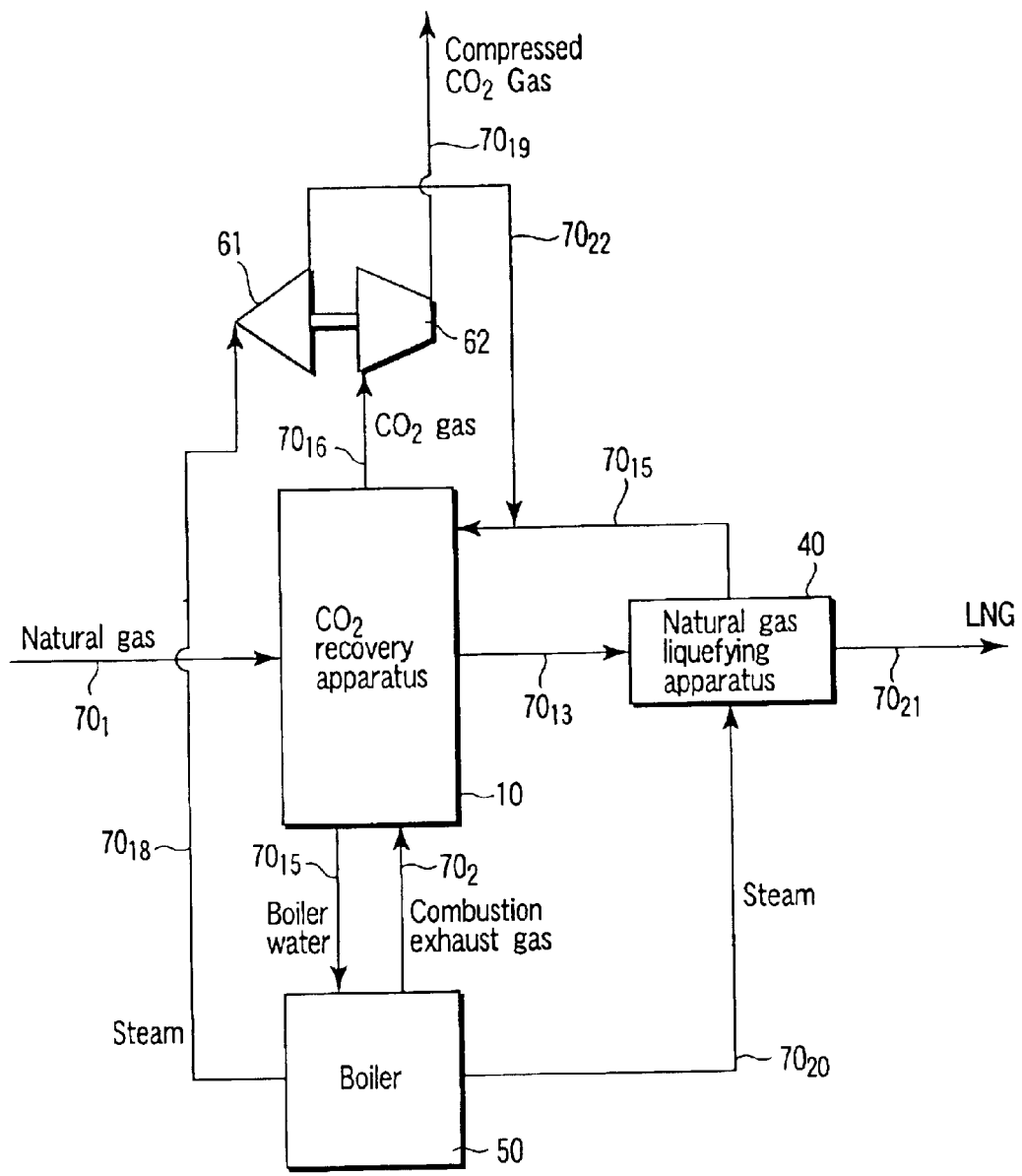
FIG. 1 is a schematic diagram showing an LNG production plant used in an embodiment of the present invention.
Figure 2:
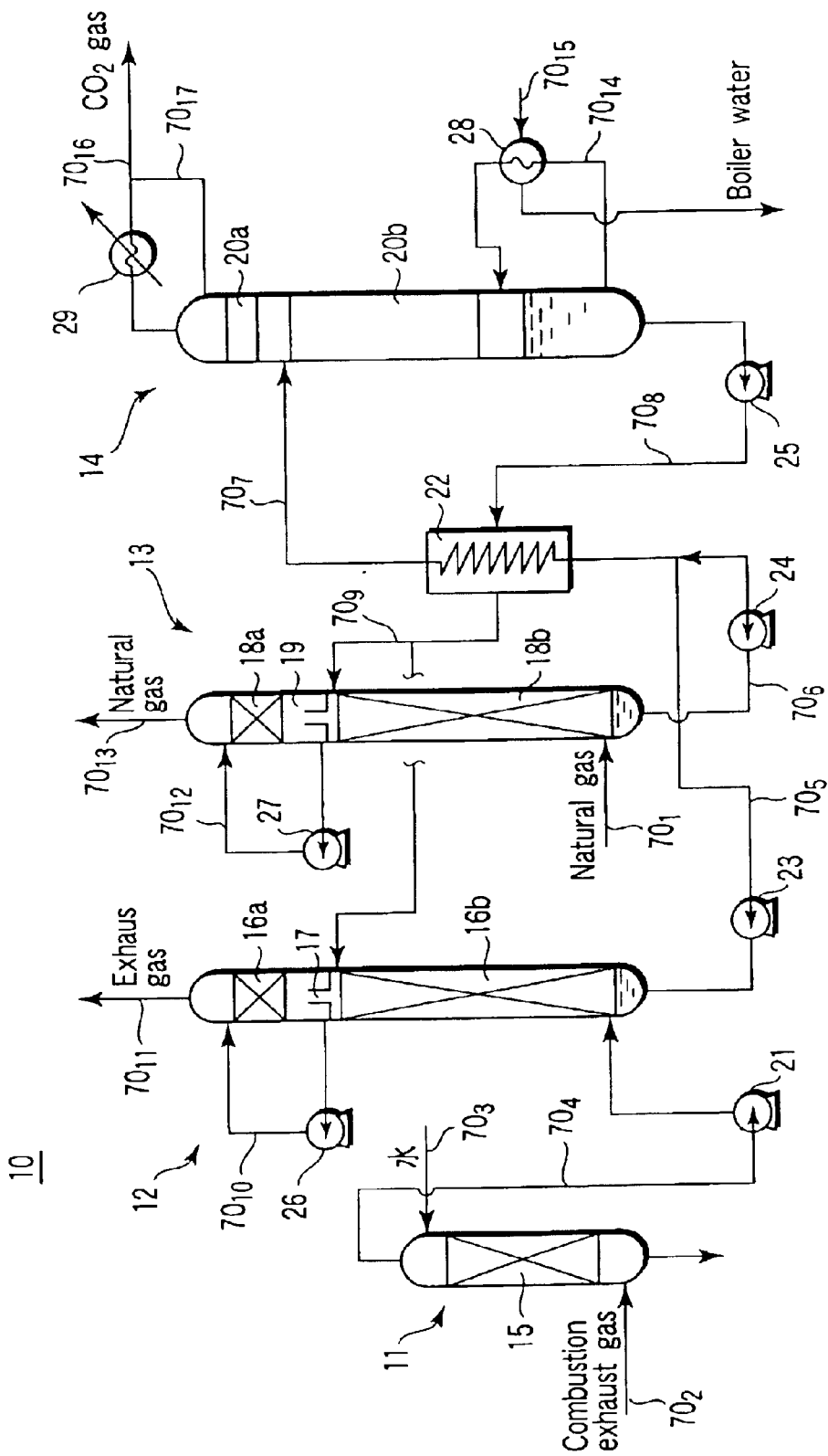
FIG. 2 is a schematic diagram of a $CO_2$ recovery apparatus installed in the LNG production plant shown in FIG. 1.

FIG. 1 is a schematic diagram of LNG production plant used in an embodiment of the present invention, and FIG. 2 is a schematic diagram of a $CO_2$ recovery apparatus installed in the LNG production plant shown in FIG. 1.

The LNG production plant comprises a $CO_2$ recovery apparatus 10, a natural gas liquefying apparatus 40 having a steam turbine (not shown), a boiler 50 serving as a power source, and a compressor 62 driven by, for example, a steam turbine 61.

A natural gas passageway $70_1$ is connected to the $CO_2$ recovery apparatus 10, which is connected to the boiler 50 through a combustion exhaust gas passageway $70_2$. The $CO_2$ recovery apparatus 10 comprises a cooling tower 11, a combustion exhaust gas absorption tower 12, a natural gas absorption tower 13, and a regeneration tower 14, all being arranged adjacent to each other.

The cooling tower 11 incorporates a gas-liquid contact member 15. The combustion exhaust gas absorption tower 12 incorporates upper and lower gas-liquid contact members 16a and 16b. An overflow portion 17 for a regenerated absorbing liquid is arranged between the gas-liquid contact members 16a and 16b. The natural gas absorption tower 13 incorporates upper and lower gas-liquid contact members 18a and 18b. An overflow portion 19 for a regenerated absorbing liquid is arranged between the gas-liquid contact members 18a and 18b. The regeneration tower 14 incorporates upper and lower gas-liquid contact members 20a and 20b.

The cooling tower 11 is connected to the boiler 50 through the combustion exhaust gas passageway $70_2$. Cooling water is sprayed to the upper portion of the cooling tower 11 through the circulating passageway $70_3$, so a combustion exhaust gas introduced through the passageway $70_2$ is cooled with the gas-liquid contact member 15. The top of the cooling tower 11 is connected to near the lower portion of the combustion exhaust gas absorption tower 12 through a passageway $70_4$. A blower 21 is inserted in the passageway $70_4$.

The bottom of the combustion exhaust gas absorption tower 12 is connected to a heat exchanger 22 through the passageway $70_5$, which is equipped with a pump 23.

The natural gas passageway $70_1$ is connected to the lower portion near the bottom of the natural gas absorption tower 13. The bottom of the absorption tower 13 is connected to the heat exchanger 22 through the passageways $70_6$ and $70_5$. The passageway $70_6$ is equipped with a pump 24.

The heat exchanger 22 is connected to the portion located between the upper and lower gas-liquid contact members 20a and 20b of the regeneration tower 14 by a passageway $70_7$.

The bottom of the generation tower 14 is connected to the upper portion (that is, to the overflow portion 17) of the combustion exhaust gas absorption tower 12 through a passageway $70_8$ (which passes through the heat exchanger 22), and also connected to the upper portion (the overflow portion 19) of the natural gas absorption tower 13 through a passageway $70_9$, which is branched from the passageway $70_8$. The pump 25 is attached on the passageway $70_8$ between the bottom of the regeneration tower 14 and the heat exchanger 22.

In the combustion exhaust gas absorption tower 12, one of the ends of the passageway $70_{10}$ is connected to the overflow portion 17 and the other end is connected to the portion of the tower 12 right above the gas-liquid contact member 16a via a pump 26. An exhaust passageway $70_{11}$ is connected to the top of the absorption tower 12.

In the natural gas absorption tower 13, one of the ends of the passageway $70_{12}$ is connected to the overflow portion 19 and the other end is connected to the portion of the tower 13 right above the gas-liquid contact member 18a via a pump 27. The one of the ends of a passageway $70_{13}$ is connected to the top of the absorption tower 13 and the other end is connected to the natural gas liquefying apparatus 40. Note that a dewatering apparatus is attached to the passageway $70_{13}$.

In the regeneration tower 14, one of the ends of a passageway $70_{14}$ is connected to the lower portion near the bottom of the regeneration tower 14 and the other end is connected to the portion of the regeneration tower 14 right under the gas-liquid contact member 20b. A heat exchanger (reboiler) 28 is attached to the passageway $70_{14}$. A passageway $70_{15}$, which flows through low-pressure steam derived from the steam turbine 61 of the compressor 62 and the steam turbine (not shown) of the natural gas liquefying apparatus 40, crosses at the reboiler 28. The low pressure stream is heat-exchanged with the regenerated absorbing liquid which flows through the passageway $70_{14}$ at the reboiler 28 and condensed.

In the regeneration tower 14, one of the ends of a passageway $70_{16}$ is connected to the top of the regenerator 14 and the other end is connected to the compressor 62 via a heat exchanger 29 for cooling. A passageway $70_{17}$ is branched off the passageway $70_{16}$ downstream of the heat exchanger 29 and connected to the regeneration tower 14 at the portion right above the gas-liquid contact member 20a.

The boiler 50 is connected to the steam turbine 61 for driving the compressor 62 by the passageway $70_{18}$ feeding a high-pressure steam. The $CO_2$ recovery apparatus 10 is connected to the compressor 62 by the flow passage $70_{16}$. $CO_2$ gas is supplied to the compressor 62, compressed, and exhausted out of the system though a passageway $70_{19}$.

The boiler 50 is connected to the steam turbine (not shown) of the natural gas liquefying apparatus 40 through a passageway $70_{20}$, which flows through high-pressure steam, and drives the apparatus 40 by the steam turbine.

The natural gas liquefying apparatus 40 liquefies natural gas (containing not more than 50 ppm $CO_2$) which is supplied from the natural gas absorption tower 13. The liquefied natural gas (LNG) flows through the passageway $70_{21}$ and stored in a predetermined tank.

One of the ends of a passageway $70_{22}$ is connected the steam turbine 61 and the other end is connected to the passageway $70_{15}$, which flows through low-pressure steam from the steam turbine (not shown) of the natural gas liquefying apparatus 40. The passageway $70_{15}$ is connected to the reboiler 28 of the regeneration tower 14.

The passageways 7015 which flows through low-pressure steam derived from the steam turbine of the natural gas liquefying apparatus 40 and from the steam turbine 61 of the compressor 62, crosses at the reboiler 28. However, either one of the low-pressure streams may be introduced to the reboiler 28.

Now, a method for producing LNG will be explained with reference to the LNG production plant shown in FIGS. 1 and 2.

First, natural gas is supplied to the lower portion near the bottom of the natural gas absorption tower 13 of the $CO_2$ recovery apparatus 10 (shown in FIG. 2) through the natural gas passageway $70_1$. The natural gas goes up through the lower gas-liquid contact member 18b of the natural gas absorption tower 13. During this process, the natural gas comes into contact with a regenerated absorbing liquid (e.g., a regenerated amine solution), which is supplied from the regeneration tower 14 to the overflow portion 19 through the passageway $70_8$ and the passageway $70_9$ (branched off the passageway $70_8$) via a heater exchanger 22, thereby absorbing $CO_2$ contained the natural gas. The natural gas further goes up through the overflow portion and the upper gas-liquid contact member 18a and comes into contact with the regenerated amine solution supplied to the upper portion near the top of the natural gas absorption tower 13 through the passageway $70_{12}$ with the help of the function of the pump 27. As a result, $CO_2$ of the natural gas remaining unabsorbed is absorbed by the amine solution until the concentration of $CO_2$ becomes 50 ppm or less. The amine solution containing $CO_2$ is stored at the bottom of the absorption tower 13. Also, $H_2S$ contained in natural gas is absorbed and removed during this $CO_2$ absorption step.

The natural gas from which $CO_2$ has been removed is supplied to a natural gas liquefying apparatus 40 through the passageway $70_{13}$. When the natural gas flows through the passageway $70_{13}$, a moisture content is removed by a dewatering apparatus (not shown) arranged thereto. The natural gas liquefying apparatus 40 is driven by supplying high-pressure steam generated by the boiler 50 to the steam turbine (not shown) of the liquefying apparatus 40 through the passageway $70_{20}$ and liquefies the natural gas dewatered. LNG is fed out from the passageway $70_{21}$ and stored in a predetermined tank. Since the $CO_2$ level of the natural gas to be liquefied is as low as 50 ppm or less, dry ice is not produced in the natural gas liquefying process.

The high-pressure steam is generated in the boiler 50 and supplied to the steam turbine 61 for driving the compressor 62 through the passageway $70_{18}$. In the boiler 50, high-pressure steam is generated by burning a fuel (e.g., natural gas). Therefore, a large amount of combustion exhaust gas containing $CO_2$ generates.

The combustion exhaust gas is supplied in its entirety to the cooling tower 11 of the $CO_2$ recovery apparatus 10 (shown in FIG. 2) through the combustion exhaust gas passageway $70_2$ and cooled by cooling water supplied through the passageway $70_3$ while passing through the gas-liquid contact member 15. The cooled combustion exhaust gas is supplied from the top of the cooling tower 11 to the lower portion near the bottom of the combustion exhaust gas absorption tower 12 through the passageway $70_4$ with the help of the blower 21. The combustion exhaust gas goes up through the lower gas-liquid contact member 16b in the absorption tower 12 and comes into contact with a regenerated amine solution, which is supplied from the regeneration tower 14 to the overflow portion 17 through the passageway $70_8$ via the heat exchanger 22, thereby absorbing $CO_2$ contained in the combustion exhaust gas by the amine solution. The combustion exhaust gas further passes through the overflow portion 17 and the upper gas-liquid contact member 16a. During this process, the combustion exhaust gas comes into contact with the regenerated amine solution, which is supplied to the portion near the top of the absorption tower 12 through the passageway $70_{10}$ with the help of the function of the pump 26. As a result, $CO_2$ of the natural gas remaining unabsorbed is absorbed. The amine solution containing $CO_2$ is stored at the bottom of the absorption tower 12. On the other hand, the combustion exhaust gas from which $CO_2$ has been removed is exhausted out of the system through the exhaust passageway $70_{11}$.

The amine solution containing the absorbed $CO_2$ and stored at the bottom of the combustion exhaust gas absorption tower 12 is supplied to the heat exchanger 22 through the passageway $70_5$ with the help of the function of the pump 23. Similarly, the amine solution containing the absorbed $CO_2$ and stored at the bottom of the natural gas absorption tower 13 is supplied to the heat exchanger 22 through the passageway $70_6$ (which is merged into the passageway $70_5$) with the help of the pump 24. When the amine solution containing the absorbed $CO_2$ passes through the heat exchanger 22, it is heat-exchanged with a regenerated amine solution having a relatively high temperature and supplied through the passageway $70_8$ connected to the bottom of the regeneration tower 14. As a result, the amine solution containing the absorbed $CO_2$ is heated, whereas the regenerated amine solution is cooled.

The amine solution containing $CO_2$ heated by the heat exchanger 22 is supplied to the portion located between the gas-liquid supply members 20a and 20b of the regeneration tower 14 through the passageway $70_7$ and goes up through the lower gas-liquid contact member 20b. During this process, the amine solution containing $CO_2$ is separated into $CO_2$ and a regenerated amine solution. The regenerated amine solution is stored at the bottom of the regeneration tower 14, circulated through the passageway $70_{14}$ and heat-exchanged at the reboiler 28, at which the passageway $70_{14}$ crosses the passageway $70_{15}$, which flows through the low-pressured steam fed from the natural gas liquefying apparatus 40 and the steam turbine 61. Since the regenerated amine solution is heated as described, the temperature of the regeneration tower 14 itself increases and used as a heat source for separating the regenerated amine solution into $CO_2$ and regenerated amine solution.

The regenerated amine solution is stored at the bottom of the regeneration tower 14 and fed back to the combustion exhaust gas absorption tower 12 through the passageway $70_8$ and to the natural gas absorption tower 13 through the passageways $70_8$ and $70_9$ (branched from $70_8$), respectively, with the function of the pump 25.

The $CO_2$ exhaust separated by the regeneration tower 14 goes up through the upper gas-liquid contact member 20a and exhausted from the top through the passageway $70_{16}$. When the $CO_2$ exhaust flows through the passageway $70_{16}$, it is cooled by the heat exchanger 29 to condense amine vapor contained in the $CO_2$ exhaust into amine solution, which is fed back to the regeneration tower 14 by way of the branched passageway $70_{17}$.

After $CO_2$ contained in natural gas and combustion exhaust gas is removed by the $CO_2$ recovery apparatus 10, $CO_2$ is supplied to the compressor 62 through the passageway $70_{16}$. At this time, high-pressure steam is supplied from the boiler 50 to the turbine 61 through the passageway $70_{18}$ to drive the turbine 61. When the compressor 62 is driven by the turbine 61, $CO_2$ supplied to the compressor is compressed and exhausted out of the system, for example, by supplying it to a urea plant, methanol plant, dimethyl ether plant, lamp oil/light oil synthesizing (GTL) plant, or the ground, through the passageway $70_{19}$. Note that when the compressed $CO_2$ is used as a raw material for a urea plant, methanol plant, dimethyl ether plant, or lamp oil/light oil synthesizing (GTL) plant, $H_2S$ contained in the compressed $CO_2$ is removed.

The low-pressure steam fed from the steam turbine 61 passes through the passageway $70_{22}$, merges into low-pressure steam supplied from the steam turbine of the natural gas liquefying apparatus 40 and flowing through the passageway 70$_{15}$, and enters the $CO_2$ recovery apparatus 10. In the $CO_2$ recovery apparatus 10, more specifically, at the reboiler 28, the low-pressure steam is exchanged with the regenerated amine solution circulated through the passageway 70$_{14}$. As a result, the regenerated amine solution is heated and conversely the low-pressure steam is cooled to condense into water. The condensed water is fed back to the boiler 50 (as a boiler water) through the passageway 70$_{15}$.

According to embodiments of the present invention, when liquefied natural gas (LNG) is produced from natural gas by the natural gas liquefying apparatus 40, $CO_2$ is recovered from the natural gas and the combustion exhaust gas generated in the boiler 50 by the $CO_2$ recovery apparatus 10, and the recovered $CO_2$ is supplied to the compressor 62 driven by the steam turbine 61, which is driven by supplying high-pressure steam from the boiler 50, compressed and discharged out of the system. In this way, no $CO_2$ or less amount of $CO_2$ is exhausted from the boiler 50. Since the amount of $CO_2$ is reduced, $CO_2$ emission tax is reduced. It is favorable in view of economy and preventing global warming.

Furthermore, $CO_2$ can be efficiently used by supplying compressed $CO_2$ from which $H_2S$ has been removed, to a urea plant, methanol plant, dimethyl ether plant, or lamp oil/light oil synthesizing (GTL) plant. However, when the aforementioned plants are not arranged adjacent to the LNG production plant, the compressed $CO_2$ is supplied into the ground such as an oil well or gas well for producing natural gas to fix it.

Furthermore, in the $CO_2$ recovery apparatus 10 for recovering $CO_2$ from natural gas or combustion exhaust gas, which is generated by the boiler 50 serving as a power source, the combustion exhaust gas absorption tower 12 and the natural gas absorption tower 13 share the regeneration tower 14. By virtue of this structure, the $CO_2$ recovery apparatus 10 can be reduced in size and, by extension, the entire LNF production plant can be miniaturized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A plant for producing liquefied natural gas comprising:
    a carbon dioxide recovery apparatus for natural gas absorbing and removing carbon dioxide from natural gas;
    a liquefying apparatus having a steam turbine, for liquefying the natural gas from which carbon dioxide has been removed by the carbon dioxide recovery apparatus;
    a boiler equipment for supplying steam to the steam turbine of the liquefying apparatus; and
    a carbon dioxide recovery apparatus for combustion exhaust gas including an absorption tower for absorbing carbon dioxide from combustion exhaust gas exhausted from the boiler equipment by absorbing liquid, and a regeneration tower for separating and recovering carbon dioxide from the absorbing liquid.

2. The plant for producing liquefied natural gas according to claim 1, wherein the carbon dioxide recovery apparatus for natural gas has an absorption tower for absorbing and removing carbon dioxide from natural gas by an absorbing liquid, and an regeneration tower for separating and recovering carbon dioxide from the absorbing liquid, the regeneration tower also serving as the regeneration tower of the carbon dioxide recovery apparatus for combustion exhaust gas.

3. The plant for producing liquefied natural gas according to claim 2, further comprises a compressor equipped with a steam turbine for compressing carbon dioxide separated and recovered from the absorbing liquid.

4. The plant for producing liquefied natural gas according to claim 3, wherein the steam turbines installed in the compressor and the liquefying apparatus are driven by steam generated by the boiler equipment.

5. The plant for producing liquefied natural gas according to claim 3, wherein the regeneration tower of the carbon dioxide recovery apparatus further comprises a reboiler using low-pressure steam supplied from at least one of the steam turbines as a heat source.

6. A method for producing liquefied natural gas comprising the steps of:
    providing a plant for producing liquefied natural gas comprising:
        (a) a carbon dioxide recovery apparatus for natural gas absorbing and removing carbon dioxide from natural gas,
        (b) a liquefying apparatus having a steam turbine, for liquefying the natural gas from which carbon dioxide has been removed by the carbon dioxide recovery apparatus,
        (c) boiler equipment for supplying steam to the steam turbine of the liquefying apparatus, and
        (d) a carbon dioxide recovery apparatus for combustion exhaust gas including an absorption tower for absorbing carbon dioxide from combustion exhaust gas exhausted from the boiler equipment by absorbing liquid, and a regeneration tower for separating and recovering carbon dioxide from the absorbing liquid;
    absorbing and removing carbon dioxide of natural gas by the absorbing liquid in the carbon dioxide recovery apparatus for natural gas;
    liquefying the natural gas from which carbon dioxide has been removed by the carbon dioxide recovery apparatus for natural gas;
    absorbing and removing carbon dioxide of combustion gas exhausted from the boiler equipment by the absorbing liquid in the carbon dioxide recovery apparatus for combustion exhaust gas; and
    regenerating the absorbing liquid by separating and recovering carbon dioxide from the absorbing liquid containing carbon dioxide in the regeneration tower of the carbon dioxide recovery apparatus for combustion exhaust gas.

7. The method for producing liquefied natural gas according to claim 6, wherein the absorbing liquid containing carbon dioxide absorbed by the carbon dioxide recovery apparatus for natural gas and the absorbing liquid containing carbon dioxide absorbed by the carbon dioxide recovery apparatus for combustion exhaust gas are regenerated by the same regeneration tower.

8. The method for producing liquefied natural gas according to claim 7, wherein the carbon dioxide separated and recovered from the absorbing liquid in the regeneration tower is compressed by a compressor having a steam turbine and thereafter exhausted out of the system.

9. The method for producing liquefied natural gas according to claim 8, wherein the steam produced by the boiler equipment is supplied to each of the steam turbines of the compressor and the liquefying apparatus.

10. The method for producing liquefied natural gas according to claim 8, wherein the regeneration tower of the carbon dioxide recovery apparatus further has a reboiler and low pressure steam supplied from at least one of the steam turbines of the compressor and the liquefying apparatus is used as a heat source of the reboiler.

* * * * *